United States Patent
Singh et al.

(10) Patent No.: US 10,163,076 B2
(45) Date of Patent: Dec. 25, 2018

(54) CONSENSUS SCHEDULING FOR BUSINESS CALENDAR

(71) Applicant: Microsoft Technology Licensing, LLC, Redmond, WA (US)

(72) Inventors: Jaskaran Singh, Redmond, WA (US); Roberto Ribeiro da Fonseca Mendes, Seattle, WA (US); Szymon Madejczyk, Sammamish, WA (US); Anna Aleksandrovna Pablo, Bellevue, WA (US); Carolyn Amy McKenna, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 612 days.

(21) Appl. No.: 14/842,097

(22) Filed: Sep. 1, 2015

(65) Prior Publication Data
US 2017/0061388 A1    Mar. 2, 2017

(51) Int. Cl.
G06F 15/16 (2006.01)
G06Q 10/10 (2012.01)
H04L 12/58 (2006.01)

(52) U.S. Cl.
CPC ....... *G06Q 10/1095* (2013.01); *G06Q 10/109* (2013.01); *H04L 51/04* (2013.01)

(58) Field of Classification Search
CPC ... G06Q 10/1095; G06Q 10/109; H04L 51/04
USPC .......................................................... 709/206
See application file for complete search history.

(56) References Cited

U.S. PATENT DOCUMENTS

| | | | |
|---|---|---|---|
| 4,653,048 A | 3/1987 | Anderson et al. | |
| 5,197,000 A | 3/1993 | Vincent | |
| 5,813,013 A | 9/1998 | Shakib et al. | |
| 5,905,863 A | 5/1999 | Knowles et al. | |
| 6,272,074 B1 | 8/2001 | Winner | |
| 7,016,909 B2 | 3/2006 | Chan et al. | |

(Continued)

FOREIGN PATENT DOCUMENTS

WO    WO9922324    5/1999

OTHER PUBLICATIONS

"International Preliminary Report on Patentability issued in PCT Application No. PCT/US2016/049409," dated Nov. 14, 2017.

(Continued)

*Primary Examiner* — Wing F Chan
*Assistant Examiner* — Joseph R Maniwang
(74) *Attorney, Agent, or Firm* — Workman Nydegger (57) ABSTRACT

Using a set of alternative events with both modern and legacy systems. A method includes identifying a master message including a set of alternative events formatted for a modern system. The master message includes default information for all events in the set of alternative events as well as exception information representing exceptions to the default information for individual events in the set of alternative of events. A plurality of instance messages is identified. Each of the instance messages includes default information from the master message and exception information for a given event in the set of alternative events. The master message and the instance messages are sent to other systems without regard to whether the other systems are modern or legacy systems so as to allow modern systems to select event alternatives using the master message and to allow legacy systems to select event alternatives using the instance messages.

20 Claims, 5 Drawing Sheets

(56) References Cited

U.S. PATENT DOCUMENTS

| | | | |
|---|---|---|---|
| 7,108,173 | B1 | 9/2006 | Wang et al. |
| 7,343,312 | B2 | 3/2008 | Capek et al. |
| 7,370,282 | B2 | 5/2008 | Cary |
| 7,490,089 | B1 | 2/2009 | Georgiev |
| 7,499,942 | B2 | 3/2009 | Simison et al. |
| 7,743,098 | B2 | 6/2010 | Anglin et al. |
| 7,818,377 | B2 | 10/2010 | Whitney |
| 7,865,872 | B2 | 1/2011 | Chamieh et al. |
| 8,495,656 | B2 | 7/2013 | Johnson et al. |
| 8,577,959 | B2 | 11/2013 | Pandey et al. |
| 8,612,876 | B2 | 12/2013 | Barnett et al. |
| 8,838,461 | B2 | 9/2014 | Beebe et al. |
| 8,850,330 | B2 | 9/2014 | Coppinger et al. |
| 8,924,269 | B2 | 12/2014 | Seubert et al. |
| 2003/0154116 | A1 | 8/2003 | Lofton |
| 2003/0225732 | A1 | 12/2003 | Chan et al. |
| 2003/0233265 | A1 | 12/2003 | Lee et al. |
| 2005/0192857 | A1 | 9/2005 | Levine |
| 2005/0222971 | A1 | 10/2005 | Cary |
| 2006/0031311 | A1 | 2/2006 | Whitney et al. |
| 2006/0200374 | A1 | 9/2006 | Nelken |
| 2007/0005409 | A1 | 1/2007 | Boss et al. |
| 2007/0079260 | A1 | 4/2007 | Bhogal et al. |
| 2007/0150503 | A1 | 6/2007 | Simison et al. |
| 2008/0114636 | A1 | 5/2008 | Nellutla |
| 2008/0147469 | A1 | 6/2008 | Murillo et al. |
| 2008/0168146 | A1 | 7/2008 | Fletcher |
| 2009/0018878 | A1 | 1/2009 | Baron et al. |
| 2009/0248474 | A1 | 10/2009 | Fried et al. |
| 2010/0254389 | A1 | 10/2010 | Singh et al. |
| 2010/0257404 | A1 | 10/2010 | Singh et al. |
| 2010/0262926 | A1 | 10/2010 | Gupta et al. |
| 2011/0015961 | A1 | 1/2011 | Chan |
| 2011/0054976 | A1 | 3/2011 | Adler et al. |
| 2011/0202999 | A1 | 8/2011 | Logan et al. |
| 2011/0225015 | A1 | 9/2011 | Spivack et al. |
| 2011/0247017 | A1 | 10/2011 | Hopkins et al. |
| 2011/0320237 | A1 | 12/2011 | Beaman et al. |
| 2012/0221369 | A1 | 8/2012 | Braatem et al. |
| 2012/0304088 | A1 | 11/2012 | Kho et al. |
| 2013/0055312 | A1 | 2/2013 | Cheng et al. |
| 2013/0067024 | A1 | 3/2013 | Vasters |
| 2013/0144672 | A1 | 6/2013 | Chakra et al. |
| 2013/0246526 | A1 | 9/2013 | Wu et al. |
| 2013/0290058 | A1 | 10/2013 | Gray et al. |
| 2013/0298043 | A1 | 11/2013 | Bailey |
| 2014/0172483 | A1 | 6/2014 | Bellers et al. |
| 2014/0229560 | A1 | 8/2014 | Gray |
| 2014/0278675 | A1 | 9/2014 | DeLuca et al. |
| 2014/0282005 | A1 | 9/2014 | Gutowitz |
| 2014/0310045 | A1 | 10/2014 | Meltzer et al. |
| 2015/0058425 | A1 | 2/2015 | Nathan et al. |
| 2016/0042324 | A1 | 2/2016 | Johnson et al. |
| 2016/0232495 | A1 | 8/2016 | Au et al. |

OTHER PUBLICATIONS

U.S. Appl. No. 14/842,013, filed Sep. 1, 2015, Singh et al.
U.S. Appl. No. 14/842,036, filed Sep. 1, 2015, Singh et al.
U.S. Appl. No. 14/842,023, filed Sep. 1, 2015, Singh et al.
U.S. Appl. No. 14/842,084, filed Sep. 1, 2015, Singh et al.
"Recurrence Patterns and EWS", Published on: Sep. 3, 2014. Available at <<https://msdn.microsoft.com/en-us/library/office/dn727655(v=exchg.150).aspx>>.
"Irregular Recurring Appointments and Meetings", Published on: Jul. 7, 2011. Available at <<http://www.msoutlook.info/question/549>>.
"Create a Repeating Event", Published on: Apr. 25, 2013. Available at <<http://support.google.com/calendar/answer/37115?h1=en>>.
"Recurring Outlook Appointments with an Irregular Pattern", Published on: Mar. 21, 2014. Available at <<http://www.alandaletraining.com/free-tips/recurring-outlook-appointments-with-an-irregular-pattern>>.
"Before your Calendar Appointments are Migrated to the New Exchange Service", Available at least as early as Jul. 8, 2015. Available at <<http://reports.is.ed.ac.uk/areas/itservices/colltools/exseed/help-and-support/migrations/exchange-premigration.pdf>>.
Glover, Ken, "Dealing with Documents for Irregularly Recurring Meetings", Published on: Apr. 13, 2012. Available at <<http://words.usask.ca/sharepointsig/2012/04/13/dealing-with-documents-for-irregularly-recurring-meetings/>>.
"WebEx Meeting Center User Guide", Published on: Aug. 1, 2014. Available at <<http://www.cisco.com/c/dam/en/us/td/docs/collaboration/meeting_center/wx_mc_host_ug.pdf>>.
"Irregular Recurring Meetings", Available at least as early as Jul. 8, 2015. Available at <<http://www.tru.ca/_shared/assets/irregular_recurring_meetings28463.pdf>>.
Hollington, Jesse, "Scheduling Irregularly Recurring Events", Published on: Oct. 19, 2012. Available at <<http://www.ilounge.com/index.php/articles/comments/scheduling-irregularly-recurring-events>> .
Nomura, et al., "A Practical Calendaring System Conforming with Ambiguous Pattern of Recurring Tasks", In Proceedings of 14th International Conference on Network-Based Information Systems, Sep. 7, 2011, pp. 553-558.
Lefkovics, William, "How can I establish recurring meetings with variations in Microsoft Outlook?", Published on: Sep. 29, 2011. Available at <<http://windowsitpro.com/outlook/q-how-can-i-establish-recurring-meetings-variations-microsoft-outlook>>.
Office Action dated Jul. 25, 2017 cited in U.S. Appl. No. 14/842,013.
Second Written Opinion Issued in PCT Application No. PCT/US2016/049346 dated Aug. 17, 2017.
International Search Report and Written Opinion issued in PCT Application No. PCT/US2016/049409 dated Nov. 10, 2016.
Office Action dated Apr. 17, 2017 cited in U.S. Appl. No. 14/842,036.
Office Action dated Apr. 6, 2017 cited in U.S. Appl. No. 14/842,084.
Second Written Opinion Issued in PCT Application No. PCT/US2016/049347, dated Mar. 6, 2017, 6 Pages.
Microsoft "Mailbox synchronization and EWS in Exchange", Retrieved From: <<https://msdn.microsoft.com/en-us/library/office/dn440952(v=exchg.150).aspx>>, Mar. 9, 2015, 4 Pages.
Microsoft "Notification subscriptions, mailbox events, and EWS in Exchange", Retrieved From <<https://msdn.microsoft.com/en-us/library/office/dn458791(v=exchg.150).aspx>>, Mar. 9, 2015, 4 Pages.
"Second Written Opinion Issued in PCT Application No. PCT/US2016/049344", dated Sep. 6, 2017, 13 Pages.
International Preliminary Report on Patentability Issued in PCT Application No. PCT/US2016/049348, dated Oct. 13, 2017, 7 Pages.
Notice of Allowanced cited in U.S. Appl. No. 14/842,033 dated Oct. 25, 2017.
"International Preliminary Report on Patentability Issued in PCT Application No. PCT/US2016/049347", dated Sep. 29, 2017, 8 Pages.
International Search Report and Written Opinion issued in PCT Application No. PCT/US2016/049346 dated Oct. 24, 2016.
Borestein et al. "MIME (Multipurpose Internet Mail Extensions) Part One: Mechanisms for Specifying and Describing the Format of Internet Message Bodies" Sep. 1993.
International Search Report and Written Opinion issued in PCT Application No. PCT/US2016/049347 dated Nov. 30, 2016.
Linthicum "Enterprise Application Integration: Chapter 13: Message Brokers and B2B Application Integration" May 1, 2000, pp. 231-236.
International Search Report and Written Opinion issued in PCT Application No. PCT/US2016/049344 dated Dec. 7, 2016.
Microsoft: "How to: Create a Recurring Series by using EWS in Exchange", Documentation online of Office Dev. Center, Mar. 9, 2015, pp. 1-8.
Microsoft: "How to: Update a Recurring Series by using EWS in Exchange", Documentation online of Office Dev. Center, May 30, 2014, pp. 1-5.
Microsoft: "How to: Update a Recurring Series by using EWS", Documentation online of Office Dev. Center, May 7, 2014, pp. 1-5.
Microsoft: "How to: Access a Recurring Series by using EWS", Documentation online of Office Dev. Center, Mar. 9, 2015, pp. 1-7.

(56) References Cited

OTHER PUBLICATIONS

Microsoft: "Recurrence Patterns and EWS Learn About Recurrence Patterns and Recurring Series in Exchange" Documentation Online of Office Dev. Center, Mar. 9, 2015, pp. 1-9.
Microsoft: "Calendars and EWS in Exchange" Documentation Online of Office Dev. Center, Mar. 9, 2015, pp. 1-4.
Smith "Exchange Server 2016 Architecture", Microsoft TechNet, May 5, 2015, pp. 1-8.
International Search Report and Written Opinion issued in PCT/US2016/049348 dated Jan. 24, 2017.
"Second Written Opinion Issued in PCT Application No. PCT/US2016/049348", dated May 12, 2017, 7 Pages.
Second Written Opinion Issued in PCT Application No. PCT/US2016/049409 dated Jun. 23, 2017.
"Corrected Notice of Allowance Issued in U.S. Appl. No. 14/842,023", dated Dec. 13, 2017, 6 Pages.
"Corrected Notice of Allowance Issued in U.S. Appl. No. 14/842,023", dated Jan. 12, 2018, 5 Pages.
"Corrected Notice of Allowance Issued in U.S. Appl. No. 14/842,036", dated Nov. 30, 2017, 4 Pages.
"Corrected Notice of Allowance Issued in U.S. Appl. No. 14/842,084", dated Dec. 18, 2017, 2 Pages.
"International Preliminary Report on Patentability Issued in PCT Application No. PCT/US2016/049346", dated Dec. 12, 2017, 7 Pages.
"International Preliminary Report on Patentability Issued in PCT Application No. PCT/US2016/049344 dated Dec. 4, 2018".
Agnantis Konstantinos and Refanidis Ioannis, "Activity Ontologies for Intelligent Calendar Application", ACM, 2015, retrievedonline on Sep. 1, 2017, pp. 1 -8. Retrieved from the Internet: <URL: http://delivery.acm.Org/10.1145/2810000/2801109/a17-agnantis.pdf?>.
Notice of Allowance dated Sep. 19, 2017 cited in U.S. Appl. No. 14/842,084.
Notice of Allowance dated Oct. 2, 2017 cited in U.S. Appl. No. 14/842,036.
Sen, et al., "Satisfying user Preferences while Negotiating Meetings", In International Journal of Human-Computer Studies, vol. 47, Issue 3, Sep. 1997, 34 pages.
Office Action dated Jul. 17, 2017 cited in U.S. Appl. No. 14/842,023.

CONSENSUS SCHEDULING FOR BUSINESS CALENDAR

BACKGROUND

Background and Relevant Art

Computers and computing systems have affected nearly every aspect of modern living. Computers are generally involved in work, recreation, healthcare, transportation, entertainment, household management, etc.

As computer technology advances, new features may be added to new (referred to herein as modern) versions of existing systems. As these features are added, there may be older (referred to herein as legacy) versions of the existing systems that are not able to natively implement the new features. However users of these legacy versions of systems may wish to take advantage of the new features in the modern versions of the systems.

For example, modern versions of scheduling systems (such as the calendar functionality included in Microsoft Exchange Server and Microsoft Outlook client available from Microsoft Corporation of Redmond, Wash.) may include functionality that allows advanced scheduling features, such as the ability to have exceptions for appointments in a series of appointments, modify individual appointments in a series of appointments, add additional appointment instances to a series of appointments, collaborate on appointment details, etc. In some situations a server may have this functionality enabled and modern clients can make use of the functionality while legacy clients are unable to make use of the functionality, even though the server supports it. While some legacy systems allow for some of this functionality as well, later changes to a series will destroy any exceptions. This can create difficulties for users of both the modern clients and the legacy clients. In particular, a user at a modern client may utilize some of the functionality of the modern server and expect other users, including users at legacy clients, to be aware of the utilization. For example, a user at a modern client may update an instance of a series of appointments. Other users using modern clients would be made aware of the update, but users on legacy clients may not be made aware of the update, or may be made aware of the update in a way that breaks the series of appointments as a series. It would be useful to implement systems where modern and legacy clients could both implement new functionality and still be able to interact with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for facilitating using a set of alternative events with both modern and legacy systems. The method includes identifying a master message including a set of alternative events formatted for a modern system. The master message includes default information for all events in the set of alternative events as well as exception information representing exceptions to the default information for individual events in the set of alternative of events. A plurality of instance messages is identified. Each of the instance messages includes default information from the master message and exception information for a given event in the set of alternative events. The master message and the instance messages are sent to other systems without regard to whether the other systems are modern or legacy systems so as to allow modern systems to select event alternatives using the master message and to allow legacy systems to select event alternatives using the instance messages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some modern calendaring systems may allow for consensus scheduling for calendar events. In particular, with reference to FIG. 1, modern calendaring system servers, such as the server 102 may be able to generate a meeting invite, shown as master message 104 with various alternatives (E1, E2, and E3) (while three alternatives are shown here, it should be appreciated that any number of alternatives may be used) for the event. For example, the meeting invite may ask recipients to choose between different alternatives in terms of different times for a given event, different locations for the given event, different subjects for the given event, different required attendees for the given event, etc. The master message 104 can be sent to users on modern clients 108-A. At the modern clients 108-A, the master message 104 can be used by each of the clients to render the alternatives on a user interface at the modern clients 108-A.

Figure 1:
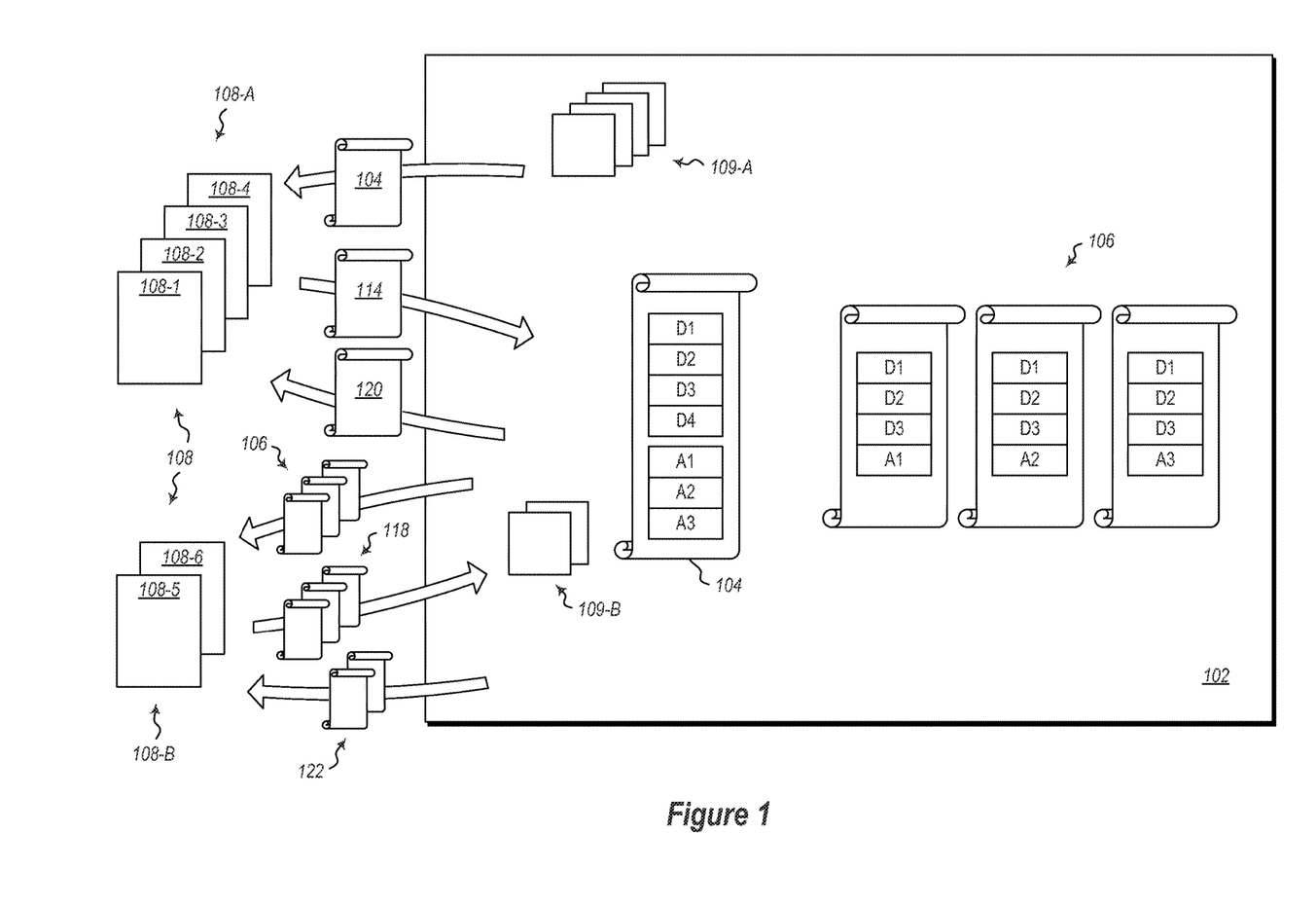
FIG. 1 illustrates a server configured perform consensus scheduling.

For example, a user at the modern client 108-1 may see an email message rendered at the client 108-1 in a graphical user interface with user selectable links that allow the user at the client 108-1 to select one of the alternatives. The user can select a link to select an alternative, which causes the response 111 to be returned to the server 102.

The users on the modern clients 108-A can respond to the master message with an appropriate response 114 to choose a preferred alternative (or rank alternatives) from among the different alternatives. In particular, because both the modern server 102 and the modern clients 108-A understand the semantics of the master message 104 and the response 114, each client only needs to receive the master message and respond with a single response 114. Note that while FIG. 1 illustrates only a single instance of the master message 104 and response 114, it should be appreciated that the master message will be sent to each of the clients 108-108-2, 108-3, 108-4, and any additional clients included in the set of modern clients 108-A, and that each client in the set of modern clients 108-A will send their own individual response 114 with different preference information.

Each user's choice can be returned to the calendaring server 102 which can then either automatically choose a consensus alternative or can allow a meeting organizer to select a consensus alternative based on all of the individual responses to the master message 104.

However, legacy clients 108-B may not include the ability to interpret the alternative information in the master message 104, and therefore, such an invite will not be usable by the legacy clients 108-B to indicate a preference for an alternative. Embodiments described herein allow multiple alternative legacy meeting invites, illustrated as instance messages 106, to be created from the master message 104. These instance messages 106 are simply legacy invite messages where each one includes one of the alternatives. As illustrated, message 106-1 includes the alternative A1, message 106-2 includes the alternative A2, and message 106-3 includes the alternative A3 in place of the default value D4. Each of the instance messages 106 is sent to each of the legacy clients as a legacy meeting invite. Thus, for example, client 108-5 will receive the messages 106-1, 106-2, and 106-3 as individual meeting invites. Similarly, client 108-6 will receive the messages 106-1, 106-2, and 106-3 as individual meeting invites. Users at the legacy clients 108-B can then respond to each invite individually, either accepting or declining each invite, as illustrated by the responses 118.

The server 102 can then use responses 118 from the legacy clients 108-B for identifying a consensus meeting. Notably, the server 102 can use the responses 118 from the legacy clients 108-B along with the responses 114 from the modern clients 108-A to identify a consensus meeting for all clients, both modern clients 108-A and legacy clients 108-B.

To alert the modern clients 108-A to the selected consensus meeting, the server 102 can simply send a confirmation message 120 to each of the modern clients 108-A which will cause the consensus meeting to appear on calendar user interfaces as the modern clients 108-A and/or to remove any of the non-selected instances from the user's calendar interface.

For the legacy clients 108-B, a number of various alternatives may be implemented for messages 122 sent to the legacy clients 108-B. For example, in some embodiments, the server 102 could send cancellations in the messages 122 for any meetings not selected by the server 102 as the consensus meeting alternative. In some embodiments, this could be selectively performed. In particular, the server 102 could determine if any decline messages had been sent for meeting alternatives that were not eventually selected as the consensus meeting. In the case where declines were already sent, there would be no need to send a cancellation message.

In some embodiments, the server 102 may need to resend invites in the messages 122 to one or more of the legacy clients 108-B for the meeting alternative eventually selected as the consensus meeting. In particular, if a client in the legacy clients 108-B has declined the meeting request for the meeting that will eventually become the consensus meeting, an invite for that meeting may need to be resent to any such clients that had declined the meeting request so that the eventual consensus meeting could be added to the legacy clients calendar view.

In some embodiments, the instance messages 106 may be specially marked to indicate to the users at the legacy clients 108-B that they are alternative meeting requests. For example, the subject fields of the instance messages 106 may include an indication that several alternatives for a single meeting are being sent and that a user should vote for a meeting alternative by accepting one meeting request and declining others for which they do not wish to vote. In these embodiments, once a consensus meeting is chosen by a meeting organizer, a cancellation may be sent for all of the meeting requests represented by the instance messages 106 (or at least any of the meeting requests that were accepted) to clear the path for a new meeting request to be sent in the messages 122 which would not include the specially marked notation indicating that it is an alternative meeting request. Instead, in some embodiments, the messages 122 may include meeting requests which are invites to the consensus meeting and which indicate that the consensus meeting was selected from the alternatives. In this way, users at the legacy clients can be alerted that a consensus has been reached and alerted to the selected consensus meeting.

Various additional details are now illustrated. Often the server 102 will not know which clients are legacy clients and which clients are modern clients. As such, embodiments may be implemented where the master message 104 and all of the instance messages 106 are all sent to all modern clients 108-A and all legacy clients 108-13. The modern clients 102-A can discard the instance messages and use the master message 104, while the legacy clients 108-B can discard the master message 104 and use the instance message 106.

However, in some embodiments, the master message 104 may include the alternatives A1, A2 and A3 by including pointers to the actual values contained in the instance messages 106-1, 106-2 and 106-3 respectively. In this case, the modern clients would obtain the default values D1, D2, D3, and D4 from the master message 104 while following the pointers to the instance messages 106-1, 106-2 and 106-3 to obtain the alternative values A1, A2, and A3 respectively.

Messages 120 and 122 may be sent to all clients as well for some embodiments. However, in other embodiments, the server 102 may be able to determine by the responses 114 and 118 (or through other protocol communications) what type of client is being communicated with and thereafter selectively send only the correct type of message to the clients based on legacy or modern status of the clients.

To send the messages 104, 106, 120, and 122 and to receive the messages 114 and 188, the server may use mailboxes 109-A and 109-B. In particular, messages can be stored at the mailboxes 109-A and 109-B by the server 102. The clients can then access the mailboxes 109-A and 109-B to retrieve the messages as appropriate. In some embodiments, the messages may be stored as email messages.

Further, while the examples illustrated herein show communication directly between the server 102 and the clients 108, embodiments may be implemented where intervening servers can be used as well. For example, instead of communicating directly with the clients 108, the server 102 may communicate with other servers which store the mailboxes 109-A and 109-B instead of the mailboxes being stored at the server 102. Notably, the other servers could be either legacy servers or modern servers. In some such embodiments, the server 102 will send all messages 104 and 106 (and potentially 120 and 122) to all clients 108 irrespective of whether or not the clients are legacy clients or modern clients. Further, the messages 104 and 106 (and potentially 120 and 122) will be sent in a format that is able to be handled by any intermediate server irrespective of whether or not the server is a modern server or a legacy server.

Details are now illustrated regarding embodiments that can be used for creation of the instance messages 106 from the master message 104.

Some embodiments herein may be implemented using a master message and a set of instance messages for a series of messages. The master message stores all of the default values for the series of messages. The instance messages store any exceptions to the default values. It may be desirable to apply the default values to the instance messages for any values that are not exception values. This may be particularly true when a default value is updated and that update needs to be propagated to the instance messages. Thus, embodiments may apply the same operation to a number of distinct items, in this case, messages. In some embodiments, the messages may be calendar items, and the series of messages may be a series of recurring calendar items.

Figure 2A:
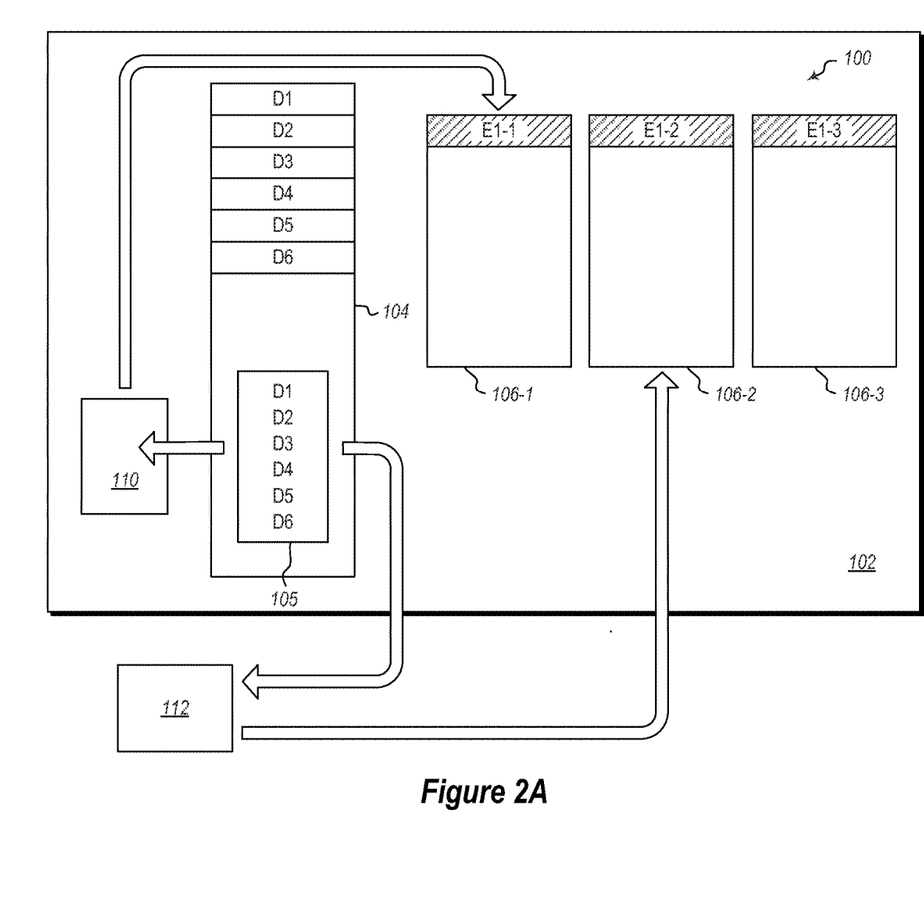
FIG. 2A illustrates a server and system for propagating values from a master message to instance messages.

Referring now to FIG. 2A, an example is illustrated. FIG. 2 illustrates a series 100 of messages. The series 100 of messages includes a master message 104 and a set of instance messages 106-1, 106-2 and 106-3. The master message 104 includes a plurality of default values D1, D2, D3, D4, D5, and D6. In the example where the series 100 of messages are calendar items, these values might include values defining dates, times, meeting attendees, locations, etc.

FIG. 2A further illustrates the instance messages 106-1, 106-2 and 106-3. While three instance messages are shown, it should be appreciated that any appropriate number of messages may be used. These instance messages include exceptions to the default values in the master message 104. For example, instance message 1064 is shown with an exception value E1-1, instance message 106-2 is shown with an exception value E1-2, and instance message 106-3 is shown with an exception value E1-3. The exception values in the instance messages may modify and/or replace the default values in the master message 104. Thus, for example, D1 may be a date. E1-1. E1-2, and E1-3 may be different dates.

Embodiments may wish to apply any default values from the master message 100 that are not superseded by exception values to the instance messages 106-1, 106-2 and 106-3. Thus, in the illustrated example, the default values D2 through D5 may need to be applied to the instance messages 106-1, 106-2 and 106-3. Various operations may be performed to apply the default values D2 through D5 to the instance messages.

Thus, in this example, the same operation(s) need(s) to be applied to a number of distinct items, in this example, messages. Embodiments may have a command queue 105 in which the command to perform an operation is logged. In this example shown in FIG. 2A, the command queue 105 is included in the master message 104. Thus, in the example, for non-pattern recurrence embodiments (as discussed in more detail below), there is a command queue 105 on each series master (e.g., master message 104) which is used to store any series level updates. These need to be applied, in the order they appear on the queue, to each instance message 106 to facilitate interoperability with legacy clients. While the examples here illustrate the command queue 105 on each master message 104, in other embodiments, the command queue 105 may be stored in other locations and associated with the master message 104.

In the illustrated example, there are two mechanisms configured to apply update commands from the command queue 105 to the instance messages, namely an in-line tool 110 and a background service 112 which will apply the command. On a series update, a command is queued up by the in-line tool 110 which tries to apply the command to each individual instance message 106. The in-line tool 110 may be, for example, an application programming interface (API) on a server 102. For example, the server 102 may be a calendaring system such as the calendaring system available in Exchange Server available from Microsoft Corporation of Redmond, Wash.

Figure 2B:
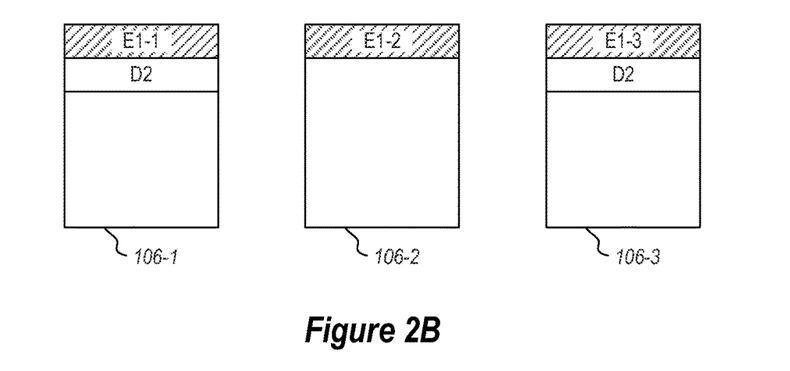
FIG. 2B illustrates instance messages being updated.

A call to the in-line tool 110 may be terminated due to system failure, operating errors, or for some other reason, in between when the call to the in-line tool 110 is made and when updates have been applied to instance messages. However, as noted, embodiments may include a background service 112 which obtains commands from the command queue 105 and applies these commands to the instance messages 106 in concert with the in-line tool 110. As the background service 112 is running independently of the in-line tool 110 there could be a race condition with the inline tool 110. Additionally or alternatively, resources may be wasted when the background service 112 first checks to see if a particular command has already been applied to each instance message 106. To optimize on both of these, embodiments may be configured to have the background service 112 apply commands from the command queue 105 to the instance messages 106-1, 106-2 and 106-3 in reverse order with respect to the order used by the in-line tool 110. For example, if the instance messages 106-1, 106-2 and 106-3 are ordered, e.g. ordered by their start times, then the inline tool is configured to update 106-1, then 106-2, and then 106-3. Contemporaneously, the background service is configured to start with 106-3, then 106-2, and then 106-1. For example, FIG. 2B illustrates an example where the in-line tool 110 applies value D2 to the instance message 106-1 while the background service 112 applies the value D2 to the instance message 106-3.

Figure 2C:
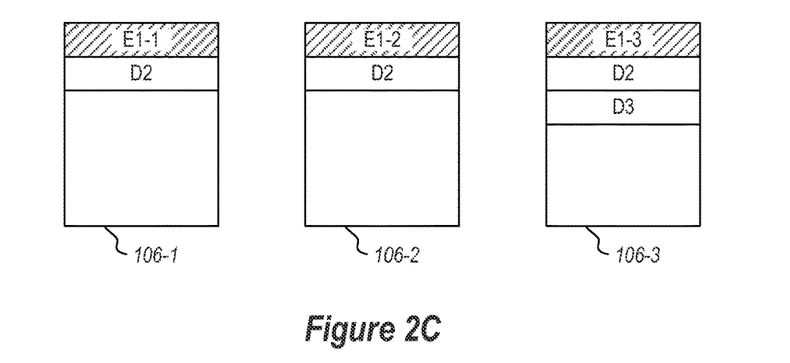
FIG. 2C illustrates instance messages being updated.
Figure 2D:
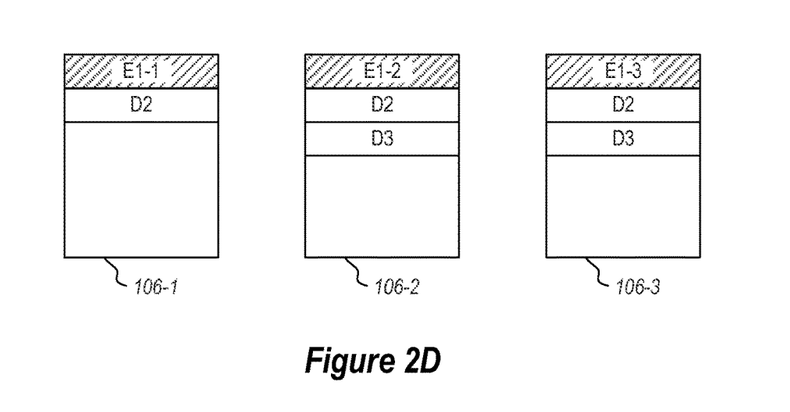
FIG. 2D illustrates instance messages being updated.

FIG. 2C illustrates an example where the in-line tool 110 has stopped applying updates for some reason. For example, perhaps the in-line tool 110 has encountered an error. In this example, the background service 112 applies the value D2 to the instance message 106-2. Since the command for applying the value D2 to the instance messages 106 has completed, the background service 112 starts executing the command(s) for applying the value D3 to the instance messages 106. In FIG. 2C, the value D3 is applied to the instance message 106-3 by the background service 112. FIG. 21) illustrates that the value D3 is then applied to the instance message 106-2 by the background service 112.

Propagation of values from flue master message 104 to the instance messages 106-1, 106-2, and 106-3 may be performed in a number of different fashions. For example, in the examples illustrated in FIGS. 1A, 1B, 1C and 1D default values are propagated in a first instance when the instance messages have no pre-existing default values or corresponding exception values. Thus, FIGS. 1A, 1B, 1C and 1D illustrate examples where exception values E1-1, E1-2, and E1-3 exist superseding the default value D1. Other than the exception values E1-1, E1-2, and E1-3, the instance messages 106-1, 106-2, and 106-3 do not include, initially, any of the other default values D2, D3, D4, D5, and D6. FIGS. 1A, 1B, 1C and 1D illustrate initial application of the default values D2, D3, D4, D5, and D6. FIGS. 1A, 1B, 1C and 1D illustrate an example where default values are added one default value at a time to the instance messages.

Figure 3:
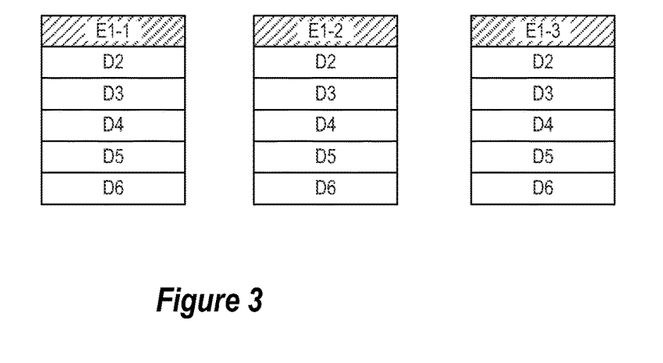
FIG. 3 illustrates instance messages being updated.

Alternatively, as illustrated in FIG. 3, when initially applying default values, embodiments could add all appropriate defaults to an instance message (i.e., default values for which there is not a superseding exception value) and then move to next instance message. In the example illustrated in FIG. 3, the in-line tool 110 applies default values D2, D3, D4, D5, and D6 to the instance message 106-1 while the background service 112 applies the default values D2, D3, D4, D5, and D6 to the instance message 106-3.

In yet an alternative embodiment, the default values D1, D2, D3, D4, D5, and D6 are applied to the instance messages 106-1, 106-2, and 106-3, as appropriate, when those messages are created and exception values E1-1, E1-2, and E1-3 can be applied to instance messages 106-1, 106-2, and 106-3 respectively later. Alternatively, the exception values E1-1, E1-2, and E1-3 can be applied to instance messages 1064, 106-2, and 106-3 respectively, while the default values D2, D3, D4, D5, and D6 are applied during the creation process of the instance messages 106-1, 106-2, and 106-3.

Figure 4A:
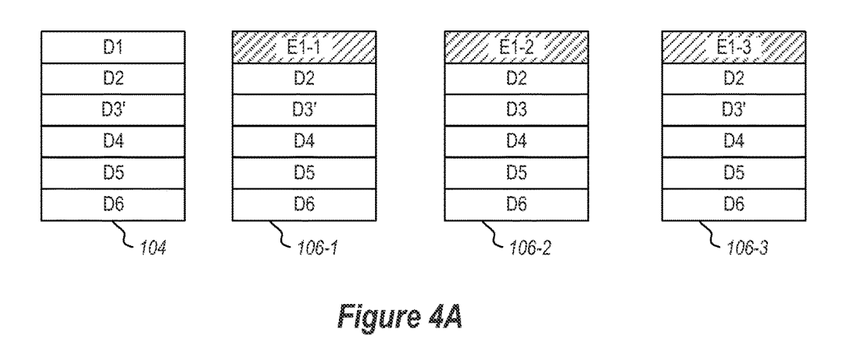
FIG. 4A illustrates instance messages being updated.
Figure 4B:
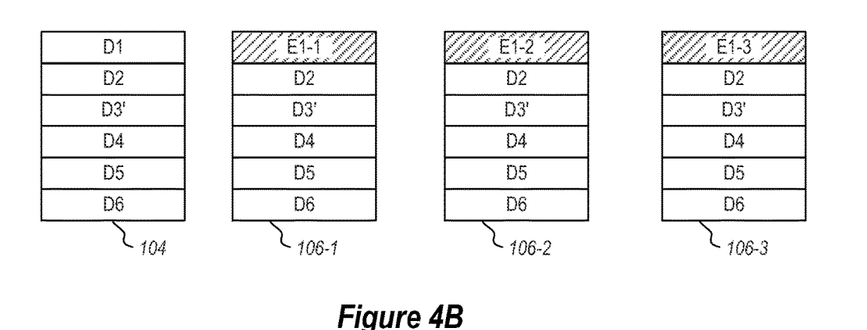
FIG. 4B illustrates instance messages being updated.

Once default values have been applied to the instance messages 106-1, 106-2, and 106-3 there may be a need to update a default value that should be applied to all messages. For example, FIG. 4A illustrates that default value D3 is updated to D3' in the master message 104. This change is propagated to the instance messages in a fashion as illustrated above. For example, FIG. 4A, the in-line tool 110 (from FIG. 2A) is used to update the instance message 106-1 while the background service 112 is used to update the instance message 106-3. FIG. 4B illustrates completion of updating all instance messages 106-1, 106-2 and 106-3 by using the in-line tool 110 and/or the background service 112.

Notably, however, updating the default value D3 to D3' does not result in an overwrite of the exception values E1-1, E1-2, and E1-3 as would normally occur in some legacy systems.

In some embodiments, the messages are email messages. For example, in some embodiments, a string of mails may exist. In some legacy systems, hashtags for a string of emails, or social media "likes" of the string emails may be able to be added to the entire string. However, to remove "like" or a hashtag from an individual message in the string, embodiments can create an exception that indicates the removal of the "like" at hashtag. The exception can be propagated as appropriate to an instance message while maintaining other default values.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
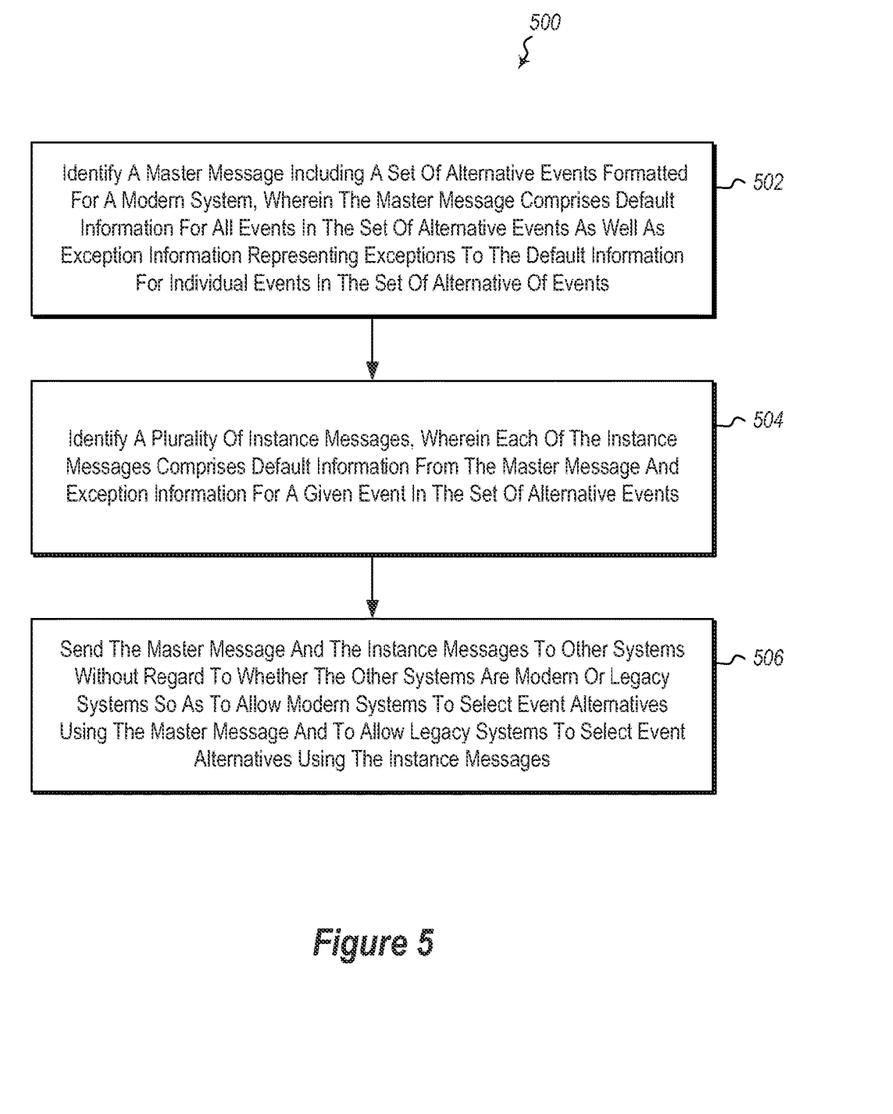
FIG. 5 illustrates a method for facilitating using a set of alternative events with both modern and legacy systems.

Referring now to FIG. 5, a method 500 is illustrated. The method 500 may be practiced in a computing environment and includes acts for facilitating using a set of alternative events with both modern and legacy systems. The method 500 includes identifying a master message including a set of alternative events formatted for a modern system, wherein the master message comprises default information for all events in the set of alternative events as well as exception information representing exceptions to the default information for individual events in the set of alternative of events (act 502).

The method 500 further includes identifying a plurality of instance messages, wherein each of the instance messages comprises default information from the master message and exception information for a given event in the set of alternative events (504).

The method 500 further includes sending the master message and the instance messages to other systems without regard to whether the other systems are modern or legacy systems so as to allow modern systems to select event alternatives using the master message and to allow legacy systems to select event alternatives using the instance messages (506).

The method 500 may be practiced where the master message is usable by modern systems to allow users at modern clients to select an alternative.

The method 500 may be practiced where the instance messages are meeting invites that allow legacy clients to select an alternative by accepting one of the instance messages and declining the rest of the instance messages.

The method 500 further includes receiving from modern clients votes for one or more of the events in the plurality of events; receiving from legacy clients one or more acceptances and one or more declines for one or more of the events in the plurality of events; and using the votes, the acceptances and the declines creating an identification of a consensus of one or more of the alternative events. In some such embodiments, the method 500 may further include sending an event request for the identified consensus to both modern and legacy clients. Alternatively or additionally, in some such embodiments, the method 500 may further include sending out a cancellation for all of the events in the set of events except one or more selected consensus events selected by an organizer to the legacy clients. Alternatively or additionally, in some such embodiments, the method 500 may further include sending out a cancellation for all of the events in the set of events and sending out one or more consensus event invites selected by an organizer to the legacy clients.

The method 500 may be practiced where the exception information is included in the master message by using pointers to the instance messages.

The method 500 further includes creating the instance messages by using the master message and propagating information from the master message to the instance messages.

Further, the methods may be practiced by a computer system including one or more processors and computer-readable media such as computer memory in particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry out desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held, devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to perform a method for facilitating communication management by generating a communications set that has been specially formatted so that at least one communication in the set is readable by a receiving computing system irrespective of whether the receiving computing system is a legacy type system or a modern type system and by controlling a distribution of that set to at least the receiving computing system, the method comprising:
   identifying a master message including a set of alternative events formatted to be readable by modern type systems, wherein the master message comprises default information for all events in the set of alternative events as well as exception information representing exceptions to the default information for individual events in the set of alternative events;
   identifying a plurality of instance messages, wherein each of the instance messages comprises at least some default information from the master message and exception information for a given event in the set of alternative events; and
   sending the communications set, which includes the master message and the instance messages, to other systems without regard to whether the other systems are modern type systems or legacy type systems, wherein the communications set is prepared in such a manner that (1) receiving modern type systems are able to selectively choose event alternatives using the master message and (2) receiving legacy type systems are able to selectively choose event alternatives using the instance messages,
   whereby the communications set is deliverable to and readable by the receiving computing system irrespective of whether the receiving computing system is the legacy type system or the modern type system.

2. The computer system of claim 1, wherein the master message is usable by modern type systems to allow users at modern type clients to select an alternative event.

3. The computer system of claim 1, wherein the instance messages are meeting invites that allow legacy clients to select an alternative event by accepting one of the instance messages and declining any remaining instance messages.

4. The computer system of claim 1, wherein the method further includes:
receiving, from modern type clients, votes for one or more of the events in the plurality of events;
receiving, from legacy type clients, one or more acceptances and one or more declines for one or more of the events in the plurality of events; and
using the votes, the one or more acceptances, and the one or more declines to create an identification of a consensus of one or more of the alternative events.

5. The computer system of claim 4, wherein execution of the computer-executable instructions further causes the computer system to send an event request for the identified consensus to both modern type clients and legacy type clients.

6. The computer system of claim 4, wherein execution of the computer-executable instructions further causes the computer system to send out a cancellation for all of the events in the set of events except one or more selected consensus events selected by an organizer to the legacy type clients.

7. The computer system of claim 4, wherein execution of the computer-executable instructions further causes the computer system to send out a cancellation for all of the events in the set of events and send out one or more consensus event invites selected by an organizer to the legacy type clients.

8. The computer system of claim 1, wherein the exception information is included in the master message by using pointers to the instance messages.

9. The computer system of claim 1, wherein execution of the computer-executable instructions further causes the computer system to create the instance messages by using the master message and propagating information from the master message to the instance messages.

10. A system for facilitating communication management by generating a communications set that has been specially formatted so that at least one communication in the set is readable by a receiving computing system irrespective of whether the receiving computing system is a legacy type system or a modern type system and by controlling a distribution of that set to at least the receiving computing system, the system comprising:
a calendaring server, wherein the calendaring server is configured to:
identify a master message including a set of alternative events formatted to be readable by modern type systems, wherein the master message comprises default information for all events in the set of alternative events as well as exception information representing exceptions to the default information for individual events in the set of alternative events;
identify a plurality of instance messages, wherein each of the instance messages comprises at least some default information from the master message and exception information for a given event in the set of alternative events; and
send the communications set, which includes the master message and the instance messages, to other systems without regard to whether the other systems are modern type systems or legacy type systems, wherein the communications set is prepared in such a manner that (1) receiving modern type systems are able to selectively choose event alternatives using the master message and (2) receiving legacy type systems are able to selectively choose event alternatives using the instance messages,
whereby the communications set is deliverable to and readable by the receiving computing system irrespective of whether the receiving computing system is the legacy type system or the modern type system.

11. The system of claim 10, wherein the calendaring server is further configured to:
receive, from modern type clients, votes for one or more of the events in the plurality of events;
receive, from legacy type clients, one or more acceptances and one or more declines for one or more of the events in the plurality of events;
use the votes, the one or more acceptances, and the one or more declines to create an identification of a consensus of one or more of the alternative events; and
send a consensus meeting to the modern type clients and the legacy type clients.

12. A method performed by a computer system to facilitate communication management by generating a communications set that has been specially formatted so that at least one communication in the set is readable by a receiving computing system irrespective of whether the receiving computing system is a legacy type system or a modern type system and by controlling a distribution of that set to at least the receiving computing system, the method comprising:
identifying a master message including a set of alternative events formatted to be readable by modern type systems, wherein the master message comprises default information for all events in the set of alternative events as well as exception information representing exceptions to the default information for individual events in the set of alternative events;
identifying a plurality of instance messages, wherein each of the instance messages comprises at least some default information from the master message and exception information for a given event in the set of alternative events; and
sending the communications set, which includes the master message and the instance messages, to other systems without regard to whether the other systems are modern type systems or legacy type systems, wherein the communications set is prepared in such a manner that (1) receiving modern type systems are able to selectively choose event alternatives using the master message and (2) receiving legacy type systems are able to selectively choose event alternatives using the instance messages,
whereby the communications set is deliverable to and readable by the receiving computing system irrespective of whether the receiving computing system is the legacy type system or the modern type system.

13. The method of claim 12, wherein the master message is usable by modern type systems to allow users at modern type clients to select an alternative event.

14. The method of claim 12, wherein the instance messages are meeting invites that allow legacy clients to select an alternative event by accepting one of the instance messages and declining the rest of the instance messages.

15. The method of claim 12, further comprising:
receiving, from modern type clients, votes for one or more of the events in the plurality of events;

receiving, from legacy type clients, one or more acceptances and one or more declines for one or more of the events in the plurality of events; and using the votes, the one or more acceptances, and the one or more declines to create an identification of a consensus of one or more of the alternative events.

16. The method of claim 15, further comprising sending an event request for the identified consensus to both modern type clients and legacy type clients.

17. The method of claim 15, further comprising sending out a cancellation for all of the events in the set of events except one or more selected consensus events selected by an organizer to the legacy type clients.

18. The method of claim 15, further comprising sending out a cancellation for all of the events in the set of events and sending out one or more consensus event invites selected by an organizer to the legacy type clients.

19. The method of claim 12, wherein the exception information is included in the master message by using pointers to the instance messages.

20. The method of claim 12, further comprising creating the instance messages by using the master message and propagating information from the master message to the instance messages.

* * * * *